US012735342B2

(12) United States Patent
Bisson et al.

(10) Patent No.: US 12,735,342 B2
(45) Date of Patent: Sep. 15, 2026

(54) SLOT DRAW PROCESS

(71) Applicant: CORNING INCORPORATED, Corning, NY (US)

(72) Inventors: Antoine Gaston Denis Bisson, Painted Post, NY (US); Bruno Le Gallic, Fontainebleau (FR); Billel Seneina, Le mée-sur-seine (FR); Xavier Tellier, Cheroy (FR)

(73) Assignee: CORNING INCORPORATED, Corning, NY (US)

( * ) Notice: Subject to any disclaimer, the term of this patent is extended or adjusted under 35 U.S.C. 154(b) by 664 days.

(21) Appl. No.: 17/928,693

(22) PCT Filed: May 26, 2021

(86) PCT No.: PCT/US2021/034260
§ 371 (c)(1),
(2) Date: Nov. 30, 2022

(87) PCT Pub. No.: WO2021/247324
PCT Pub. Date: Dec. 9, 2021

(65) Prior Publication Data
US 2023/0212051 A1 Jul. 6, 2023

Related U.S. Application Data

(60) Provisional application No. 63/034,053, filed on Jun. 3, 2020.

(51) Int. Cl.
*C03B 17/06* (2006.01)
*C03B 7/07* (2006.01)

(52) U.S. Cl.
CPC ................ *C03B 17/06* (2013.01); *C03B 7/07* (2013.01)

(58) Field of Classification Search
CPC ................................ C03B 17/06; C03B 5/225
See application file for complete search history.

(56) References Cited

U.S. PATENT DOCUMENTS 1,692,615 A * 11/1928 Blair ....................... C03B 17/06 65/194
1,761,342 A * 6/1930 Hitner ..................... C03B 17/06 373/41

(Continued)

FOREIGN PATENT DOCUMENTS

CN 102906036 A 1/2013
CN 103608305 A 2/2014

(Continued)

OTHER PUBLICATIONS

Chinese Patent Application No. 202180037269.5, Office Action dated Nov. 30, 2023, 4 pages (English Translation only), Chinese Patent Office.

(Continued)

*Primary Examiner* — Jodi C Franklin
*Assistant Examiner* — Steven S Lee
(74) *Attorney, Agent, or Firm* — Ryan T. Hardee; Grant A. Gildehaus

(57) ABSTRACT

An improved slot down-draw process for forming glass sheets having a thickness less than 200 μm from glass formulations that have melting points near or above 1200° C. is provided. The improvements allow easier maintenance of the slot assembly and better management of the thermal expansions experienced by some components of the slot down-draw system.

20 Claims, 7 Drawing Sheets

(56) References Cited

U.S. PATENT DOCUMENTS

RE18,071 E * 5/1931 Hitner ..................... C03B 17/06 373/41
1,865,843 A * 7/1932 Drake ..................... C03B 17/06 65/186
3,473,911 A 10/1969 Stein et al.
7,735,338 B2 6/2010 Mueller et al.
8,393,176 B2 3/2013 Tsuda et al.
2008/0184741 A1 8/2008 Mueller et al.
2009/0217708 A1* 9/2009 DeAngelis ............ C03B 17/064 65/157
2009/0226733 A1 9/2009 Kato et al.
2012/0297838 A1 11/2012 Borsa et al.
2012/0304695 A1 12/2012 Lakota et al.
2013/0333420 A1* 12/2013 Goller ....................... C03B 7/02 65/135.1
2016/0229729 A1* 8/2016 Peterson ................. C03B 17/02
2017/0057860 A1 3/2017 Habeck et al.
2018/0273416 A1* 9/2018 Demirbas ................. C03B 5/43
2018/0297882 A1* 10/2018 De Angelis ............... C03B 5/43
2018/0354837 A1* 12/2018 Kim .......................... C03B 7/06
2019/0144324 A1* 5/2019 De Angelis ............. C03B 13/04 65/90
2019/0308900 A1 10/2019 Vogl et al.

FOREIGN PATENT DOCUMENTS

CN 104761127 A 7/2015
CN 107531535 A 1/2018
CN 110255867 A * 9/2019 ............. C03B 15/02
CN 110698043 A * 1/2020 ........... C03B 17/061
CN 111018315 A 4/2020
DE 102004007560 B4 2/2006
DE 102008063554 A1 6/2010
DE 102017124625 A1 6/2018
EP 1347944 B1 9/2007
JP H0712948 B2 * 2/1995 ........... C03B 17/062
JP 2000335924 A * 12/2000 ............. C03B 17/06
JP 4788951 B2 * 10/2011 ............. C03B 13/02
KR 10-2014-0105741 A 9/2014
TW M451362 U * 4/2013
WO WO-2010069918 A1 * 6/2010 ........... C03B 17/061
WO 2013/081827 A1 6/2013
WO 2016/144715 A2 9/2016
WO 2018/088031 A1 5/2018
WO 2019/081312 A1 5/2019
WO WO-2019124018 A1 * 6/2019 ........... C03B 17/064

OTHER PUBLICATIONS

International Search Report and Written Opinion of the International Searching Authority; PCT/US2021/034260; dated Sep. 13, 2019; 11 pages; European Patent Office.
Korean Patent Application No. 10-2023-7000076, Office Action dated Jan. 9, 2025, 6 pages (English Translation only), Korean Patent Office.

* cited by examiner

SLOT DRAW PROCESS

CROSS REFERENCES

This application is a national stage entry of International Patent Application Serial No. PCT/US2021/034260 filed on May 26, 2021, which in turn, claims the benefit of priority under 35 U.S.C. § 119 of U.S. Provisional Application Ser. No. 63/034,053 filed on Jun. 3, 2020, the contents of each of which are relied upon and incorporated herein by reference in their entireties.

FIELD

The present disclosure relates to a method for producing glass sheets, in particular glass sheets with a thickness of less than 200 μm thickness.

BACKGROUND

Many of the modern applications for sheet glass require not only improved toughness but also require ultrathin (less than 200 μm thickness) glass sheets. Producing such thin glass sheets require glass compositions that are significantly different than those conventionally used. Sometimes, such new glass compositions are high temperature compositions, generally having melting temperatures above 1200° C., that generally cannot be made on a single platform such as fusion draw.

Slot draw process is a down-draw process where glass is delivered from a machined slot shaped orifice, then pulled downwards to reach the target thickness, that is better able to produce the ultrathin glass sheets. More and more demanding applications, however, require substantial improvement on product attributes, that the existing slot draw equipment capabilities cannot achieve. Thus, an improved slot draw process is desired.

SUMMARY

An improved slot down-draw glass forming system is provided. The slot down-draw glass forming system comprises: a molten glass delivery section; a glass conditioner diffusing section connected to the molten glass delivery section and in fluid communication with the molten glass delivery section; a glass conditioner vertical section; and a terminal slot assembly that comprises: a top lip; and a bottom lip, wherein the bottom lip is removably coupled to the top lip, and wherein the bottom lip is configured to be removed from the terminal slot assembly without removing the top lip.

A slot down-draw glass forming system according to another embodiment is provided. The system comprises: a molten glass delivery section; a glass conditioner connected to the molten glass delivery section and in fluid communication with the molten glass delivery section, wherein the glass conditioner comprises a diffusing section, a vertical section, an elbow section connecting the diffusing section and the vertical section, and a platinum passageway for carrying the molten glass extending through the diffusing section, the elbow section, and the vertical section; a first casing portion surrounding the platinum passageway in the conditioner diffusing section; a second casing portion surrounding the platinum passageway in the conditioner vertical section; an elbow casing portion surrounding the platinum passageway in the elbow section; wherein the first casing portion and the elbow casing portion are arranged in linear alignment with the platinum passageway in the conditioner diffusing section and the first casing portion and the elbow casing portion are configured to controllably move the elbow casing portion away from the first casing portion while maintaining the linear alignment to accommodate any thermal expansion of the platinum passageway in the conditioner diffusing section as the slot down-draw glass forming system heats up from ambient temperature to glass processing temperature; and a terminal slot assembly.

According to another embodiment, a slot down-draw glass forming system comprises: a molten glass delivery section; a glass conditioner connected to the molten glass delivery section and in fluid communication with the molten glass delivery section; a platinum passageway for carrying a flow of the molten glass through the glass conditioner to a terminal slot assembly; and a casing enclosing the platinum passageway near the terminal slot assembly; wherein the terminal slot assembly defining a slot through which a glass ribbon is drawn vertically downward and the terminal slot assembly comprises: a top lip; and a bottom lip. The slot has a width and the top lip extends beyond the width of the slot and defining a first end and a second end, wherein the casing comprises two independently laterally movable portions, a first movable portion and a second movable portion that correspond to the first end and the second end of the top lip, wherein the first end of the top lip is connected to the first movable portion of the casing and the second end of the top lip is connected to the second movable portion of the casing, wherein the top lip and the casing are configured to controllably move the first movable portion of the casing in the lateral direction with respect to the first end of the top lip and controllably move the second movable portion of the casing in the lateral direction with respect to the second end of the top lip to accommodate any thermal expansion of the top lip as the slot down-draw glass forming system heats up from ambient temperature to glass processing temperature, wherein the bottom lip also extends beyond the width of the slot and defining a first end and a second end, each of the two ends of the bottom lip are connected to a bottom lip support frame that comprises a first movable portion and a second movable portion that are independently laterally movable, wherein the two ends of the bottom lip and the two movable portions of the bottom lip support frame are configured to controllably move the first movable portion in the lateral direction with respect to the first end of the bottom lip and controllably move the second movable portion in the lateral direction with respect to the second end of the bottom lip to accommodate any thermal expansion of the bottom lip as the slot down-draw glass forming system heats up from ambient temperature to glass processing temperature.

BRIEF DESCRIPTION OF THE DRAWINGS

These figures are provided for the purposes of illustration, it being understood that the embodiments disclosed and discussed herein are not limited to the arrangements and instrumentalities shown. The figures are schematic and they are not to scale. They are not intended to show dimensions or actual proportions.

While this description can include specifics, these should not be construed as limitations on the scope, but rather as descriptions of features that can be specific to particular embodiments.

DETAILED DESCRIPTION

Various embodiments for improved glass forming processes are described with reference to the figures, where like elements have been given like numerical designations to facilitate an understanding.

It also is understood that, unless otherwise specified, terms such as "top," "bottom," "outward," "inward," and the like are words of convenience and are not to be construed as limiting terms. In addition, whenever a group is described as comprising at least one of a group of elements and combinations thereof, the group can comprise, consist essentially of, or consist of any number of those elements recited, either individually or in combination with each other.

Similarly, whenever a group is described as consisting of at least one of a group of elements or combinations thereof, the group can consist of any number of those elements recited, either individually or in combination with each other. Unless otherwise specified, a range of values, when recited, includes both the upper and lower limits of the range. As used herein, the indefinite articles "a," and "an," and the corresponding definite article "the" mean "at least one" or "one or more," unless otherwise specified.

Those skilled in the art will recognize that many changes can be made to the embodiments described while still obtaining the beneficial results of the disclosure. It also will be apparent that some of the desired benefits of the present disclosure can be obtained by selecting some of the described features without using other features. Accordingly, those of ordinary skill in the art will recognize that many modifications and adaptations are possible and can even be desirable in certain circumstances and are part of the disclosure. Thus, the following description is provided as illustrative of the principles of the present disclosure and not in limitation thereof.

Disclosed herein are various embodiments of improved slot down-draw process for forming ultrathin (having a thickness less than 200 μm) glass sheets from glass formulations that have forming temperatures (i.e. delivery temperatures) in the range of 800-1200° C. The improved slot draw process can also handle glass formulations with forming temperatures in the range of 600-1400° C.

Figure 1:
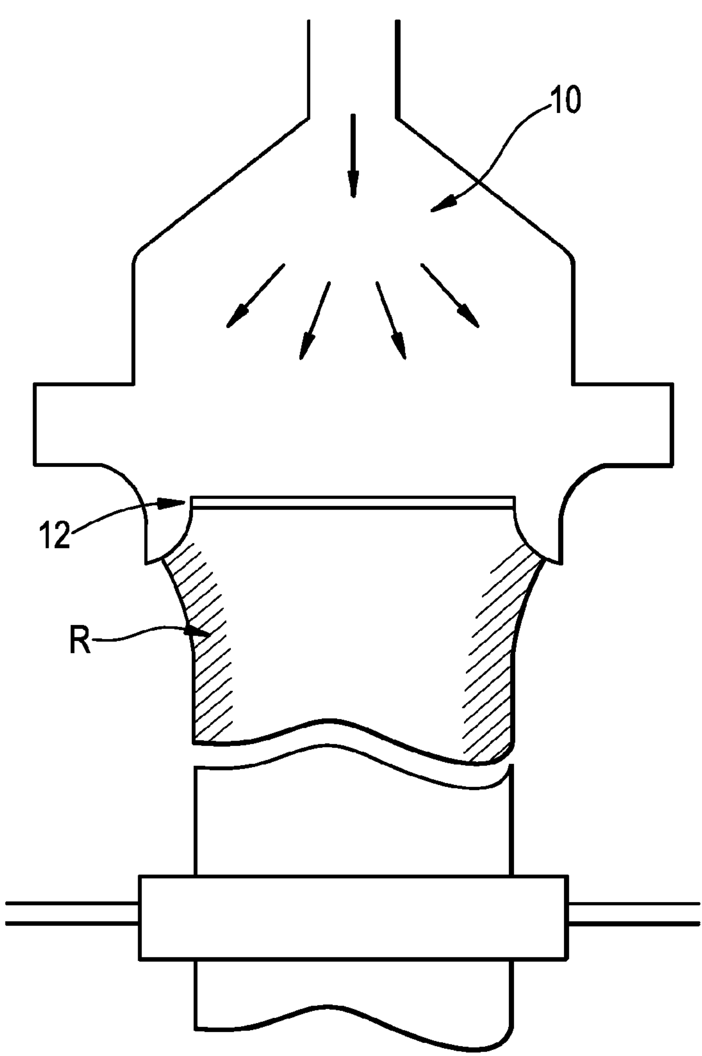
FIG. 1 is a rough illustration showing the general concept of the slot down-draw process.

FIG. 1 is a rough schematic illustration showing the general concept of the slot down-draw process. In slot down-draw processes the molten glass is delivered from a slot 12 at the terminal end of a platinum passageway 10 as shown. The slot 12 can be formed by a lip made of platinum or platinum alloy. The glass ribbon R dispensing from the slot is drawn downward as a continuous sheet and into an annealing region.

Figure 2:
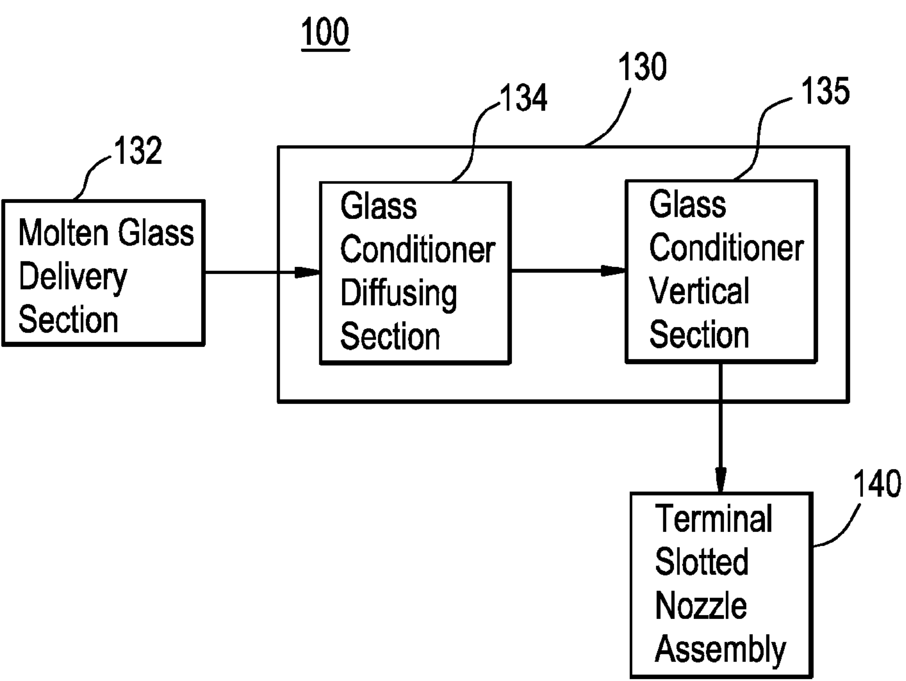
FIG. 2 is an illustration of the improved slot down-draw glass forming system for forming a glass sheet from molten glass according to some embodiments of the present disclosure.

Referring to FIG. 2, an improved slot down-draw glass forming system 100 for forming a glass sheet from molten glass is described herein. The improved system is particularly suited for making glass sheets that are less than 200 μm thick.

Figure 3:
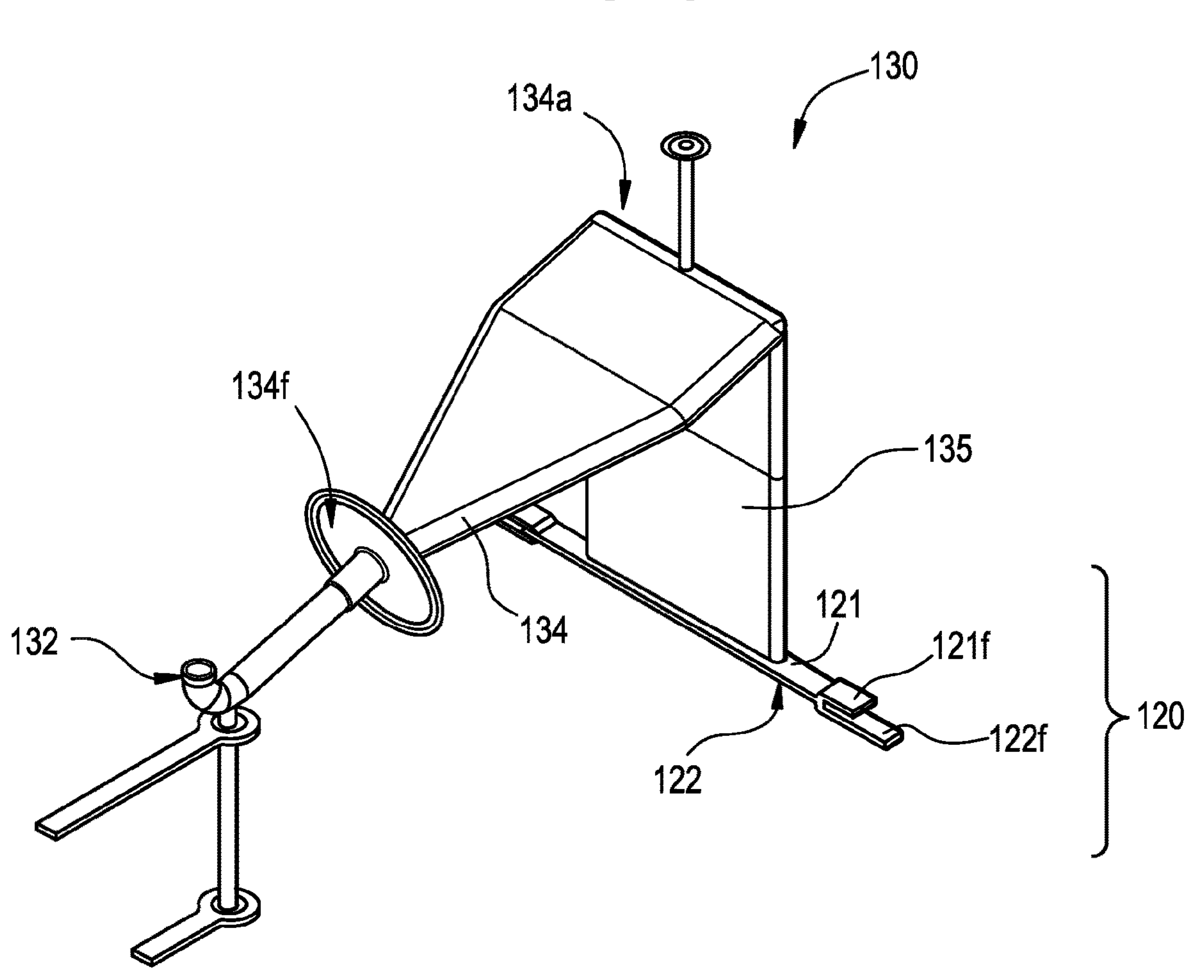
FIG. 3 is an illustration of the glass conditioner portion of the improved slot down-draw glass forming system.

Detachable 2-Part Assembly Slot:

In some embodiments, the improved slot down-draw glass forming system 100 comprises a molten glass delivery section 132 configured to deliver a continuous supply of molten glass to a glass conditioner 130 section. Referring to FIG. 3, the glass conditioner 130 includes a glass conditioner diffusing section 134 connected to the molten glass delivery section 132 and in fluid communication with the molten glass delivery section 132, a glass conditioner vertical section 135, an elbow section **134*a* connecting the diffusing section 134 and the vertical section 135, and a terminal slot assembly 120. The glass conditioner diffusing section 134 transforms the supply of molten glass received as a tubular flow into a molten glass flow whose cross-sectional shape is roughly rectangular that is about (500-1000 mm) wide×(5-20 mm) deep. The diffusion process transforms the geometry of the molten glass flow to match the geometry of the downstream terminal slot assembly 120. The glass conditioner vertical section 135 is configured to turn the molten glass flow from the glass conditioner diffusion section in to a vertical orientation to flow down toward the downstream terminal slot assembly 120**.

Figure 4:
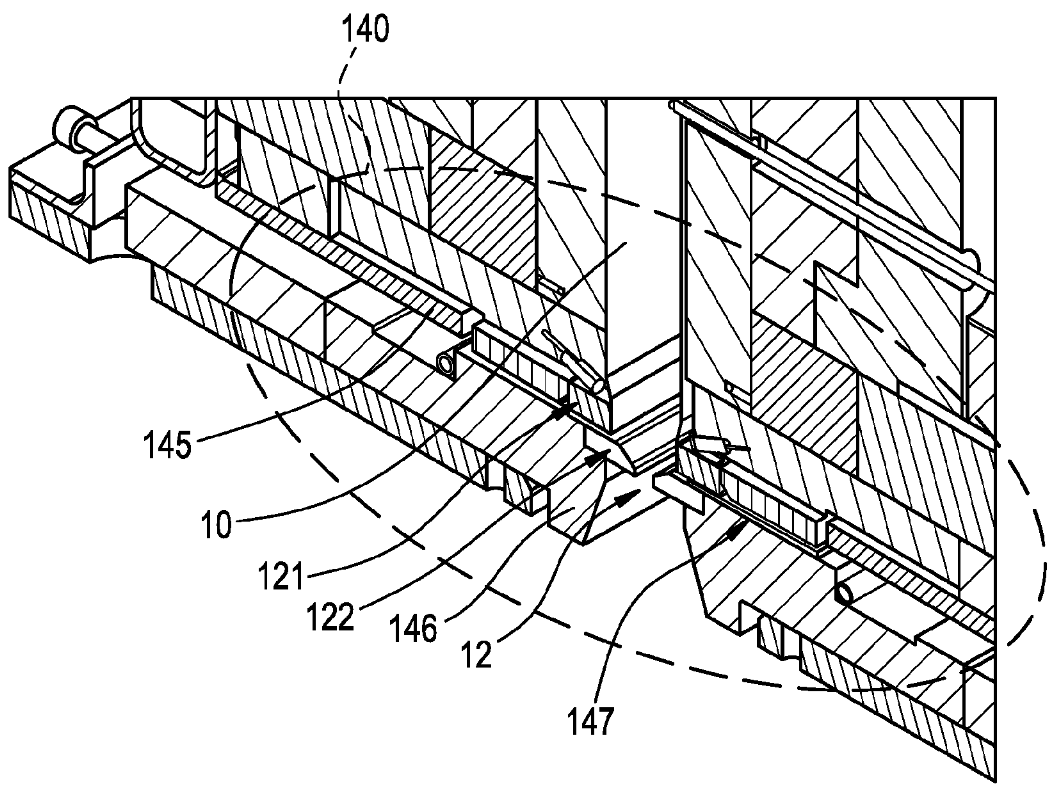
FIG. 4 is an illustration of a cross-sectional view of the terminal slot assembly 140 provided at the end of the glass conditioner vertical section of the present disclosure where the section is taken orthogonally through the slot.

Referring to FIG. 4, unlike in a conventional slot down-draw system, the terminal slot assembly 120 according to some embodiments of the present disclosure comprises a top lip 121 and a bottom lip 122. The top lip 121 forms a wider slot and does not need to be removed during maintenance procedures and can be generally affixed to the section of the platinum passageway 10 in the glass conditioner vertical section 135. The top lip 121 can be welded to the platinum passage way 10.

The bottom lip 122 forms a slot that is narrower than that top lip 121 and dispenses glass ribbon R of the desired thickness for the downstream down-draw process steps. The bottom lip 122 is removably coupled to the top lip 121 so that the bottom lip 122 can be removed from the terminal slot assembly 120 without removing the top lip 121. A supporting frame of refractory insulation 146 supports the bottom lip 122. The supporting frame 146 is clamped against the top slot supporting frame 145. A refractory fiber felt layer 147 is inserted between the top lip 121 and the bottom lip 122 as a glass seal layer to avoid direct contact between the two slots. Having the bottom lip 122 removable allows a faster replacement of the bottom lip 122 without having to cool down the upstream parts during maintenance procedures.

Direct Fired Zones for the Conditioner and the Terminal Slot:

In some embodiments of the slot down-draw glass forming system 100, at least one or both of the top lip 121 and the bottom lip 122 can be configured as direct heating element(s) by Joule heating. To effectuate the Joule heating, electrical current is applied through the particular slot structure to be heated. The temperature is then controlled by controlling the amount of current sent through the structure. This allows accurate control of the temperature of the flow of molten glass passing through the lips 121, 122 to maintain optimal flow rate by controlling the glass viscosity. Like most components that come in direct contact with the molten glass, the top and bottom lips 121, 122 are made of platinum or platinum alloy and are well suited for Joule heating. The direct heating of the down-draw system components themselves allow accurate temperature control and provide ability to process glass compositions with significantly higher melting temperature compared to the conventional slot down-draw glass forming systems.

The glass conditioner diffusing section 134 has a molten glass receiving end 134*a* and a molten glass discharging end 134*b*. In some embodiments, the molten glass receiving end 134*a* is configured as a heating element by Joule heating. The molten glass receiving end 134*a* section can be connected to electrical current source for the Joule heating. In some embodiments, a direct heating flange 134*f* element can be fitted onto the molten glass receiving end 134*a* to effect the electrical connection.

In some embodiments, the glass conditioner vertical section 135 can be configured to heat the sides of the vertical section by Joule heating. This feature can be used to develop sides to center temperature gradients in the molten glass flowing down through the glass conditioner vertical section 135.

Figure 5:
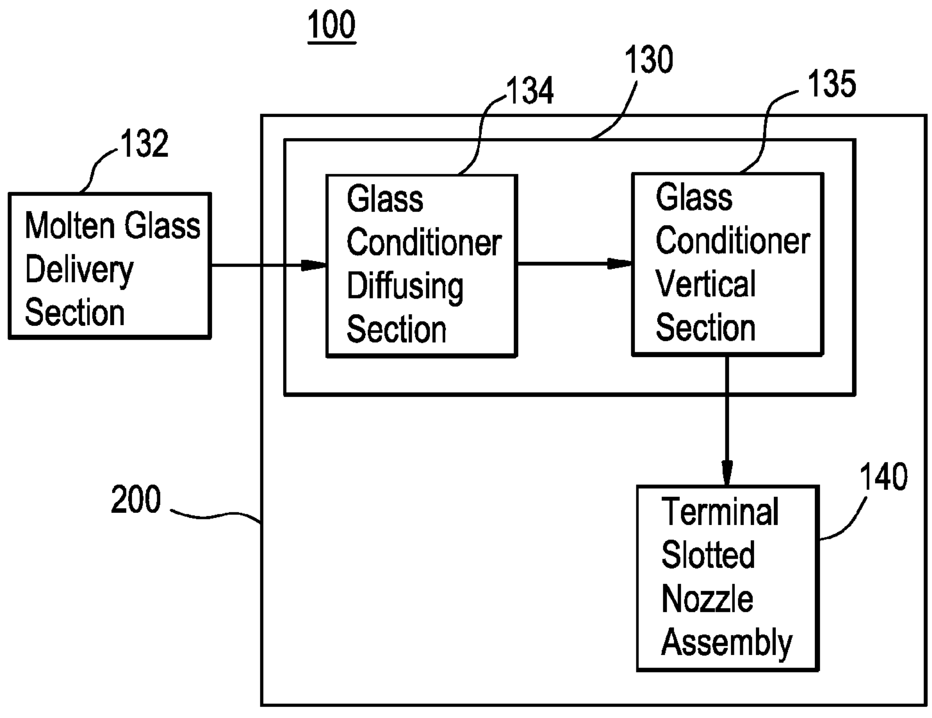
FIG. 5 is an illustration of an embodiment of an enclosure that encapsulates the glass conditioning assembly according to the present disclosure.

Controlled Atmosphere:

Some glass compositions benefit from provision of a controlled environment (e.g., oxygen, hydrogen, humidity, temperature, gas flow rate, pressure, etc.) surrounding the various parts of the slot down-draw glass forming system 100. This is generally not simple to do. According to an aspect of the present disclosure, an air tight stainless steel enclosure structure 200 encapsulates portions of the slot down-draw glass forming system 100 with a closed-loop control system to provide the controlled environment. Preferably, the enclosure structure 200 encapsulates the glass conditioner 130 portions. For example, the controlled environment within the enclosure structure 200 is controlled to limit the level of hydrogen around the exterior (non-glass contacting surface) of the components of the glass conditioner 130 to suppress the formation of gaseous inclusions and surface blisters in glass sheets. In addition, the closed-loop control system and the enclosure structure 200 maintain an atmosphere with minimal oxygen around the glass-contacting precious metal components to prevent unwanted oxidation. The glass-contacting precious metal components can be made of platinum or platinum alloys. Some examples of the glass-contacting precious metal components are the platinum passageway 10 for carrying the molten glass through the glass forming system 100 and the top and bottom lips 121, 122. Referring to FIG. 5, in some embodiments, the enclosure 200 is configured to surround and encapsulate the glass conditioner diffusing section 134, the glass conditioner vertical section 135, and the terminal slot assembly 140.

Vertical and Horizontal Thermal Expansion Management System:

The higher melting point glass compositions required for forming the ultrathin glass sheets require the glass conditioner 130 to experience large temperature gradients in different sections of the conditioner 130 which create significant thermal expansion of the conditioner components, many of which are made of platinum and/or platinum alloys. A system of adjustable mechanical arrangements is provided to manage the thermal expansion of the components.

The mechanical arrangement disclosed herein form thermal expansion management system and allows the glass conditioner assembly 130 to accommodate the thermal expansion of the platinum components caused by the temperature change from ambient temperature to the nominal processing temperature of the glass conditioner parts, to reduce undesirable mechanical stresses in different components of the glass conditioner assembly 130. The nominal processing temperature of the glass conditioner parts will depend on the particular composition of the molten high temperature glass. Generally, the nominal processing temperature is between about 90° C.-about 1200° C. The thermal expansion management system prevents mechanical deformation of the components of the glass forming system resulting from any mismatched thermal expansion among components.

When a large temperature gradient exists between two adjacent components of the glass conditioner assembly 130, the components will expand by different amount and can cause mechanical stresses. The problem can be exacerbated when the adjacent components are made of different materials having different coefficients of thermal expansion (CTE) and the component with greater CTE is at a higher temperature. This is the situation in the glass conditioner assembly 130. The platinum passageway 10 carrying the molten glass will be at higher temperature than the surrounding components of the glass conditioner assembly 130 and the platinum components have higher CTE than the surrounding components.

The thermal expansion management system according to the present disclosure comprises placing the two unevenly expanding adjacent parts on one or more guided rails to allow relative movement between the two unevenly expanding adjacent parts. The uneven expansion between the two adjacent parts result from the temperature gradient that exists during the operation of the slot down-draw glass forming process. The thermal expansion management system also controllably moves the components that experience smaller thermal expansion to accommodate the thermal expansion of the adjacent parts that experience greater thermal expansion.

Figure 6A:
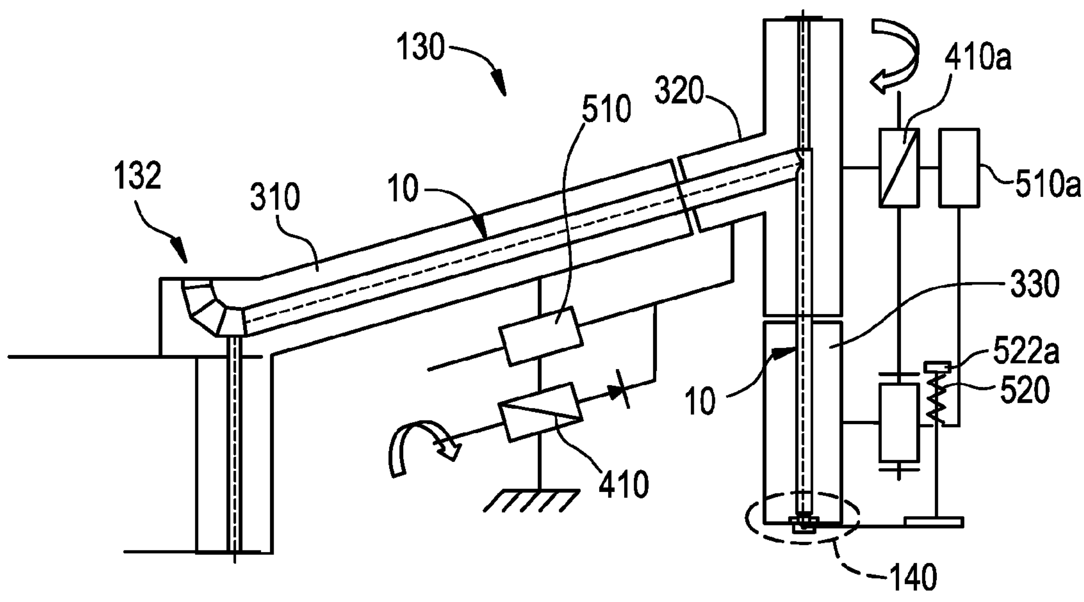
FIG. 6A is an illustration of a side-view cross-section of the glass conditioner portion of the improved slot down-draw glass forming system according to the present disclosure.

A slot down-draw glass forming system incorporating such thermal expansion management feature is disclosed. Referring to FIGS. 3 and 6A, the glass conditioner section 130 and the molten glass delivery section 132 are illustrated. The glass conditioner 130 is connected to the molten glass delivery section 132 and is in fluid communication with the molten glass delivery section 132. The glass conditioner 130 comprises a diffusing section 134, a vertical section 135, an elbow section 134*a* connecting the diffusing section 134 and the vertical section 135, and a platinum passageway 10 for carrying the molten glass extending through the diffusing section 134, the elbow section 134*a*, and the vertical section 135. A first casing portion 310 surrounds the platinum passageway 10 in the conditioner diffusing section; 134. A second casing portion 330 surrounds the platinum passageway 10 in the conditioner vertical section 135. An elbow casing portion 320 surrounds the platinum passageway 10 in the elbow section 134*a*. The first casing portion 310 and the elbow casing portion 320 are arranged in linear alignment with the platinum passageway 10 in the conditioner diffusing section 134. The first casing portion 310 and the elbow casing portion 320 are configured to controllably move the elbow casing portion 320 away from the first casing portion 310 while maintaining the linear alignment to accommodate any thermal expansion of the platinum passageway 10 in the conditioner diffusing section 134 as the slot down-draw glass forming system heats up from ambient temperature to glass processing temperature. The terminal slot assembly 140 provided at the terminal end of the glass conditioner vertical section 135 is also illustrated.

Because the molten glass flows through the platinum passageway 10, during the start-up of the slot down-draw system, where everything is starting from ambient temperature, a substantial thermal gradient is formed between the platinum passageway 10 and the surrounding casings: the first casing portion 310, the elbow casing portion 320, and the second casing portion 330 where the platinum passageway 10 is at a substantially higher (more than 100° C.) temperature. Because of the thermal gradient, the platinum passageway 10 expands sooner and also expands more than the casings. This effect is amplified by the fact that the platinum passageway 10 has greater CTE than the casing material and the surrounding structures like the casings are made of non-precious metals and some parts with refractory material having smaller CTEs. The first casing portion 310 and the elbow casing portion 320 being configured to controllably move the elbow casing portion away from the first casing portion 310 extends the combined length of the first casing portion 310 and the elbow casing portion 320 in the diffusion section 134 to match the thermal expansion of the platinum passageway 10 in the diffusion section 134. The first casing portion 310 and the elbow casing portion 320 needs to be maintained in a linear alignment with the platinum passageway 10 so that as the two casing portions are moved apart, they do not interfere or damage the structure of the platinum passageway 10.

In some embodiments, the controllably moving the elbow casing portion 320 away from the first casing portion 310 is achieved by one or more adjustable pushrods 410 arranged between the first casing portion 310 and the elbow casing portion 320. The adjustable pushrods 410 can comprise a threaded bolt and sleeve arrangement that can push or pull the elbow casing portion 320 to adjust the position of the elbow casing portion 320 in reference to the first casing portion 310 by turning the threaded bolt or the threaded sleeve depending on the particular implementation of such arrangement.

In some embodiments, the one or more adjustable pushrods 410 can be manually turned to control and adjust the position of the elbow casing portion 320. In some embodiments, the one or more adjustable pushrods 410 can be remotely manipulated by stepper motors, for example, to control and adjust the position of the elbow casing portion 320.

In some embodiments, one or more set of rail and linear bearings 510 can be provided for the moving part, in this case the elbow casing portion 320, so that the linear alignment between the first casing portion 310 and the elbow casing portion 320 can be maintained while the elbow casing portion 320 is moving.

In some embodiments, the amount of thermal expansion of the platinum passageway 10 in the conditioner diffusing section 134 is determined by monitoring the temperature of the platinum passageway 10 in the conditioner diffusing section 134. Because the CTE of the platinum passageway is known, the amount the platinum passageway 10 will expand linearly can be calculated. Appropriate thermocouples or other appropriate devices can be used for the temperature monitoring.

Figure 6B:
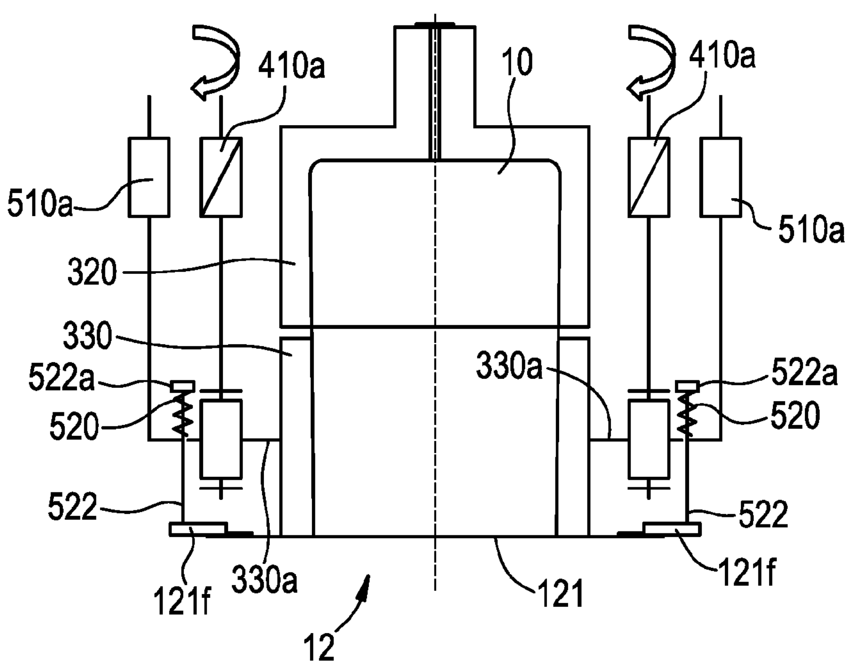
FIG. 6B is an illustration of the glass conditioner vertical section according to the present disclosure.

Referring to FIG. 6B, in order to manage the thermal expansion of the components in the vertical section 135 of the conditioner 130, the elbow casing portion 320 and the second casing portion 330 are configured to controllably move the second casing portion 330 away from the elbow casing portion 320 to accommodate any thermal expansion of the platinum passageway 10 in the conditioner vertical section 135 as the slot down-draw glass forming system 100 heats up from ambient temperature to glass processing temperature. The elbow casing portion 320 and the second casing portion 330 are arranged in linear alignment with the platinum passageway 10 in the conditioner vertical section 135 and the linear alignment is maintained while the second casing portion 330 is controllably moved.

In some embodiments, controllably moving the second casing portion 330 is achieved by one or more adjustable pushrods that are arranged between the elbow casing portion 320 and the second casing portion 330. In some embodiments, the one or more adjustable pushrods 410*a* can be manually turned to control and adjust the position of the second casing portion 330. In some embodiments, the one or more adjustable pushrods 410*a* can be remotely manipulated by stepper motors, for example, to control and adjust the position of the second casing portion 330.

In some embodiments, one or more set of rail and linear bearings 510*a* can be provided for the moving second casing portion 330, so that the linear alignment between the elbow casing portion 320 and the second casing portion 330 can be maintained while the second casing portion 330 is moving.

In some embodiments, the amount of thermal expansion of the platinum passageway 10 in the conditioner vertical section 135 is determined using one or more stack of conical spring washers 520. In the illustrated example shown in FIG. 6B, two stacks of conical spring washers 520 are utilized, one on each side of the conditioner vertical section 135. Each of the stacks of conical spring washers 520 is positioned so that when the platinum passageway 10 in the conditioner vertical section 135 expands as the hot molten glass flows through it, the expanding platinum passageway 10 exerts compressive force on the stacks of conical spring washers 520. Thus, by monitoring the compression of the conical spring washers in each stack 520, the amount of thermal expansion by the platinum passageway can be determined. This information is used to adjust the one or more adjustable pushrods 410*a* and move the second casing portion 330 away from the elbow casing portion 320 by an appropriate amount to accommodate the expansion of the platinum passageway 10. An example of the conical spring washers are Belleville washers, also know as Belleville discs.

For the stack of conical spring washers 520 to operate as descried, the conical spring washers 520 are captured between a fixture or a bracket 330*a* that is affixed to the second casing portion 330 and a compression cap 522*a* that is attached to the top lip 121 of the terminal slot assembly 140. A flange 121*f* extends from each end of the top lip 121, extending beyond the width of the slot 12, and the compression cap 522*a* is connected to the flange 121*f*. The top lip 121 is attached to the platinum passageway 10. Thus, when the platinum passageway 10 expands with respect to the second casing portion 330, because the elbow section 134*a* of the conditioner 130 is fixed in the vertical direction, the platinum passageway 10 expands downward in the view shown in FIG. 6B. This downward movement, in turn, pulls the compression cap 522*a* downward and compresses the conical spring washers 520. Thus, by monitoring the increased compression of the one or more stack of conical spring washers 520, one can determine the amount of thermal expansion of the platinum passageway in the conditioner vertical section.

In some embodiments, the amount of thermal expansion of the platinum passageway 10 in the conditioner vertical section 135 can be determined by monitoring the temperature of the platinum passageway 10 in the conditioner diffusing section 134. Appropriate thermocouples or other appropriate devices can be used for the temperature monitoring.

Thermal Expansion Management System for the Top and Bottom Lips of the Slot Assembly:

In some embodiments, the slot down-draw glass forming system 100 comprises a terminal slot assembly 140 defining a slot 12 through which a glass ribbon R is drawn vertically downward where the terminal slot assembly 140 comprises a top lip 121 and a bottom lip 122. The slot 12 has a width Wand the top lip 121 extends beyond the width W of the slot 12 and the top lip 121 defines a first end 121' and a second end 121". The second casing portion 330 comprises two independently laterally movable portions, a first movable portion 330' and a second movable portion 330" that correspond to the first end 121' and the second end 121" of the top lip 121. The first end 121' of the top lip 121 is connected to the first laterally movable portion 330' and the second end 121" of the top lip 121 is connected to the second laterally movable portion 330". Laterally movable refers to the two movable portions 330' and 330" being movable in the direction parallel to the length of the top lip 121 (i.e., substantially horizontal in the view shown in FIG. 6C).

The top lip 121 and the second casing portion 330 are configured to controllably move the first movable portion 330' in the lateral direction with respect to the first end 121' of the top lip 121 and controllably move the second movable portion 330" in the lateral direction with respect to the second end 121" of the top lip 121 to accommodate any thermal expansion of the top lip 121 as the slot down-draw glass forming system heats up from ambient temperature to glass processing temperature. The top lip 121 and the bottom lip 122 are platinum or platinum alloy structures and thus even at the same temperature, the top lip 121 and the bottom lip 122 expand substantially more than the surrounding casings and frame components which are made of non-precious metals and refractory materials.

In some embodiments, one or more adjustable pushrods 410*b* are arranged between each of the two ends 121', 121" of the top lip 121 and the respective first and second movable portions 330', 330" of the second casing for controllably moving the two movable portions 330', 330" in the lateral direction with respect to the two respective ends 121', 121" of the top lip. In some embodiments, the one or more adjustable pushrods 410*b* can be manually controlled. In some embodiments, the one or more adjustable pushrods 410*b* are remotely controlled using stepper motors, for example. In some embodiments, one or more set of rail and linear bearings 510*b* are provided for facilitating the movement of the two movable portions 330', 330".

Figure 6C:
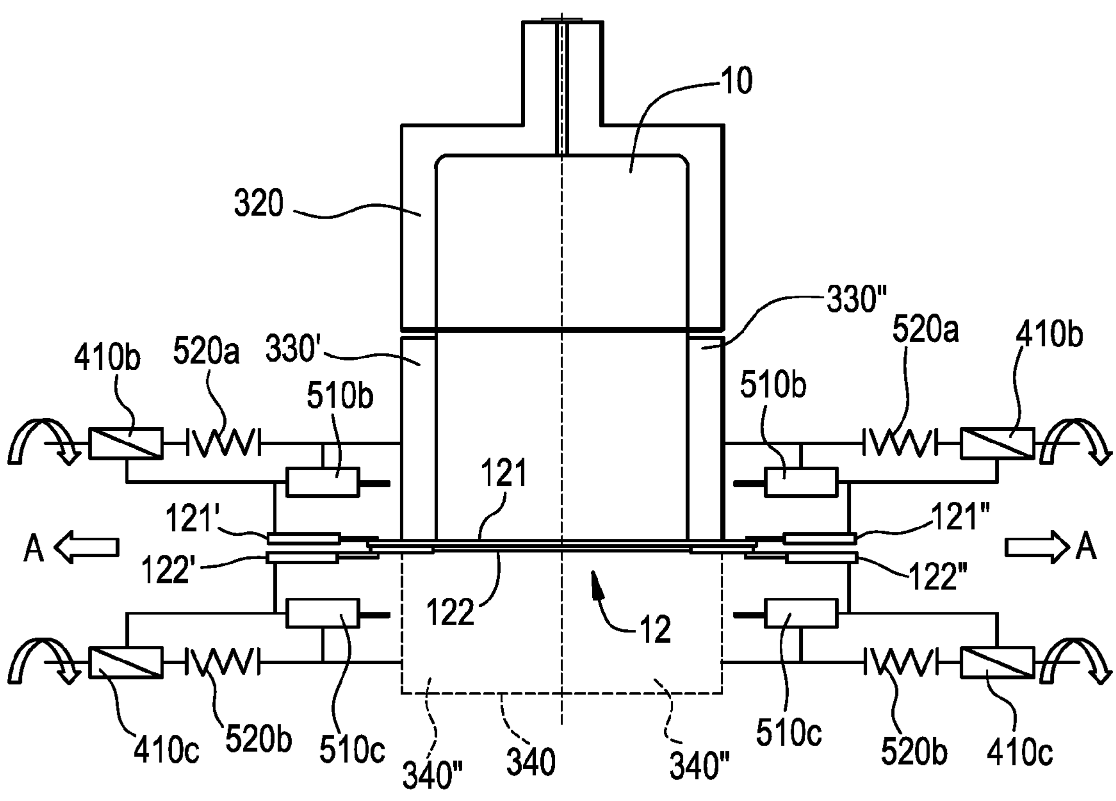
FIG. 6C is an illustration showing the top lip and the bottom lip of the slot at the terminal end of the glass conditioner vertical section according to the present disclosure.

The amount of thermal expansion being experienced by the top lip 121 can be detected by one or more set of stacked conical spring washers 520*a*. As shown in FIG. 6C, each stack of conical spring washers 520*a* is configured to be situated between the casing 330 and the adjustable pushrod 410*b* which, in turn, is connected to one end 121', 121" of the top lip 121. As the top lip 121 expands, it will move outward from the slot 12 structure represented by the arrow A. This will urge the pushrod 410*b* in the same outward direction which lowers the compression on the stack of conical spring washers 520*a*. Thus, by monitoring the decrease in the compression in the stack of conical spring washers 520*a*, the amount of thermal expansion being experienced by the top lip 121 can be determined and corresponding adjustment is made to accommodate the thermal expansion by moving the movable portions 330', 330" of the casing 330 in the outward direction A using the pushrod 410*b*.

In some embodiments, the bottom lip 122 also extends beyond the width W of the slot 12 and the bottom lip 122 defines a first end 122' and a second end 122". The bottom lip 122 is attached to a bottom lip support frame 340. The bottom lip support frame 340 comprises two separately laterally movable portions, a first movable portion 340' and a second movable portion 340" that correspond to the first end 122' and the second end 122" of the bottom lip 122. Laterally movable refers to the two movable portions 340' and 340" being movable in the direction parallel to the length of the bottom lip 122.

The bottom lip 122 and the bottom lip support frame 340 are configured to controllably move the first movable portion 340' in the lateral direction with respect to the first end 122' of the bottom lip 122 and controllably move the second movable portion 340" in the lateral direction with respect to the second end 122" of the bottom lip 122 to accommodate any thermal expansion of the bottom lip 122 as the slot down-draw glass forming system heats up from ambient temperature to glass processing temperature.

In some embodiments, one or more adjustable pushrods 410*c* are arranged between each of the two ends 122', 122" of the bottom lip 122 and the two movable portions 340', 340" of the bottom lip support frame 340, respectively, for controllably moving the two movable portions 340', 340" in the lateral direction with respect to the first end 122' and the second end 122" of the bottom lip 122, respectively. In some embodiments, the one or more adjustable pushrods 410*c* can be manually controlled. In some embodiments, the one or more adjustable pushrods 410*c* are remotely controlled using stepper motors, for example. In some embodiments, one or more set of rail and linear bearings 510*c* are provided for facilitating the movement of the two movable portions 340', 340".

The amount of thermal expansion being experienced by the bottom lip 122 can be detected by one or more set of stacked conical spring washers 520*b*. As shown in FIG. 6C, each stack of conical spring washers 520*b* is configured to be situated between the bottom lip support frame 340 and the adjustable pushrod 410*c* which, in turn, is connected to one end 122', 122" of the bottom lip 122. As the bottom lip 122 expands, it will move outward from the slot 12 structure represented by the arrow A. This will urge the pushrod 410*c* in the same outward direction which lowers the compression on the stack of conical spring washers 520*a*. Thus, by monitoring the decrease in the compression in the stack of conical spring washers 520*b*, the amount of thermal expansion being experienced by the bottom lip 122 can be determined and corresponding adjustment is made to accommodate the thermal expansion by moving the movable portions 340', 340" of the bottom lip support frame 340 in the outward direction A using the pushrod 410*c*.

Those skilled in the art will appreciate that many modifications to the exemplary embodiments described herein are possible without departing from the spirit and scope of the disclosure. Thus, the description is not intended and should not be construed to be limited to the examples given but should be granted the full breadth of protection afforded by the appended claims and equivalents thereto. In addition, it is possible to use some of the features of the present disclosure without the corresponding use of other features. Accordingly, the foregoing description of exemplary or illustrative embodiments is provided for the purpose of illustrating the principles of the present disclosure and not in limitation thereof and can include modification thereto and permutations thereof.

While preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof

What is claimed is:

1. A slot down-draw glass forming system comprising:

a molten glass delivery section;

a glass conditioner diffusing section connected to the molten glass delivery section and in fluid communication with the molten glass delivery section at a first end, wherein the glass conditioner diffusing section extends from the first end to a second end, wherein the first end defines a first shape and the second end defines a second shape, wherein the second shape is greater in a first dimension than the first shape in the first dimension such that molten glass traveling downstream from the first end to the second end diffuses to flow according to the second shape;

a glass conditioner vertical section positioned downstream of the second end of the glass conditioner diffusing section; and a terminal slot assembly positioned downstream of the glass conditioner vertical section, wherein the terminal slot assembly comprises:

a top lip, wherein the top lip is configured as a heating element by Joule heating; and a bottom lip, wherein the bottom lip is configured as a heating element by Joule heating, wherein the bottom lip is removably coupled to the top lip, and wherein the bottom lip is configured to be removed from the terminal slot assembly without removing the top lip.

2. The slot down-draw glass forming system of claim 1, wherein the bottom lip is coupled to the top lip by a supporting frame.

3. The slot down-draw glass forming system of claim 1, further comprising a layer of refractory fiber felt provided between the top lip and the bottom lip.

4. The slot down-draw glass forming system of claim 1, wherein the glass conditioner diffusing section has a molten glass receiving end as the first end and a molten glass discharging end as the second end, wherein the molten glass receiving end is configured as a heating element by Joule heating.

5. The slot down-draw glass forming system of claim 1, further comprising:

an enclosure structure that encapsulates the glass conditioner diffusing section, the glass conditioner vertical section, and the terminal slot assembly with a controlled atmosphere to reduce oxidation of platinum components of the glass conditioner diffusing section, the glass conditioner vertical section, and the terminal slot assembly.

6. The slot down-draw glass forming system of claim 1, wherein the terminal slot assembly defines a slot with a width, and wherein the top lip extends into the width of the slot.

7. The slot down-draw glass forming system of claim 1, wherein the top lip defines a first slot, wherein the bottom lip defines a second slot, wherein the first slot is wider than the second slot.

8. A slot down-draw glass forming system comprising:

a molten glass delivery section;

a glass conditioner diffusing section connected to the molten glass delivery section and in fluid communication with the molten glass delivery section at a first end, wherein the glass conditioner diffusing section extends from the first end to a second end;

a glass conditioner vertical section positioned downstream of the second end of the glass conditioner diffusing section, wherein an elbow section is disposed between the glass conditioner vertical section and the glass conditioner diffusing section to direct flow of the molten glass from the glass conditioner diffusing section to the glass conditioner vertical section; and a terminal slot assembly positioned downstream of the glass conditioner vertical section, wherein the terminal slot assembly comprises:

a top lip; and a bottom lip, wherein the bottom lip is removably coupled to the top lip, and wherein the bottom lip is configured to be removed from the terminal slot assembly without removing the top lip, wherein the top lip is attached to the terminal slot assembly to extend into a slot within the terminal slot assembly to define a first slot width, wherein the bottom lip is attached to the terminal slot assembly to extend into the slot to define a second slot width, wherein the first slot width is wider than the second slot width.

9. The slot down-draw glass forming system of claim 8, wherein the bottom lip is coupled to the top lip by a supporting frame.

10. The slot down-draw glass forming system of claim 8, further comprising a layer of refractory fiber felt provided between the top lip and the bottom lip.

11. The slot down-draw glass forming system of claim 8, wherein the bottom lip is configured as a heating element by Joule heating.

12. The slot down-draw glass forming system of claim 11, wherein the top lip is configured as a heating element by Joule heating.

13. The slot down-draw glass forming system of claim 12, wherein the glass conditioner diffusing section has a molten glass receiving end as the first end and a molten glass discharging end as the second end, wherein the molten glass receiving end is configured as a heating element by Joule heating.

14. The slot down-draw glass forming system of claim 8, further comprising:

an enclosure structure that encapsulates the glass conditioner diffusing section and the terminal slot assembly with a controlled atmosphere to reduce oxidation of platinum components of the glass conditioner diffusing section and the terminal slot assembly.

15. A slot down-draw glass forming system comprising:

a molten glass delivery section;

a glass conditioner diffusing section connected to the molten glass delivery section and in fluid communication with the molten glass delivery section at a first end, wherein the glass conditioner diffusing section extends from the first end to a second end, wherein the first end defines a tubular shape and the second end defines a roughly rectangular shape such that molten glass traveling downstream from the first end to the second end diffuses to flow according to the roughly rectangular shape;

a glass conditioner vertical section positioned downstream of the second end of the glass conditioner diffusing section, wherein an elbow section is disposed between the glass conditioner vertical section and the glass conditioner diffusing section to direct flow of the molten glass from the glass conditioner diffusing section to the glass conditioner vertical section; and a terminal slot assembly positioned downstream of the glass conditioner vertical section, wherein the terminal slot assembly comprises:

a top lip; and a bottom lip, wherein the bottom lip is removably coupled to the top lip, and wherein the bottom lip is configured to be removed from the terminal slot assembly without removing the top lip.

16. The slot down-draw glass forming system of claim 15, wherein the bottom lip is coupled to the top lip by a supporting frame.

17. The slot down-draw glass forming system of claim 15, further comprising a layer of refractory fiber felt provided between the top lip and the bottom lip.

18. The slot down-draw glass forming system of claim 15, further comprising:

an enclosure structure that encapsulates the glass conditioner diffusing section and the terminal slot assembly with a controlled atmosphere to reduce oxidation of platinum components of the glass conditioner diffusing section and the terminal slot assembly.

19. The slot down-draw glass forming system of claim 15, wherein the terminal slot assembly defines a slot with a width, and wherein the top lip extends into the width of the slot.

20. The slot down-draw glass forming system of claim 15, wherein the top lip defines a first slot, wherein the bottom lip defines a second slot, wherein the first slot is wider than the second slot.

* * * * *